S. T. SAVAGE.
Heating Stove.
No. 20,667.
Patented June 22, 1858.
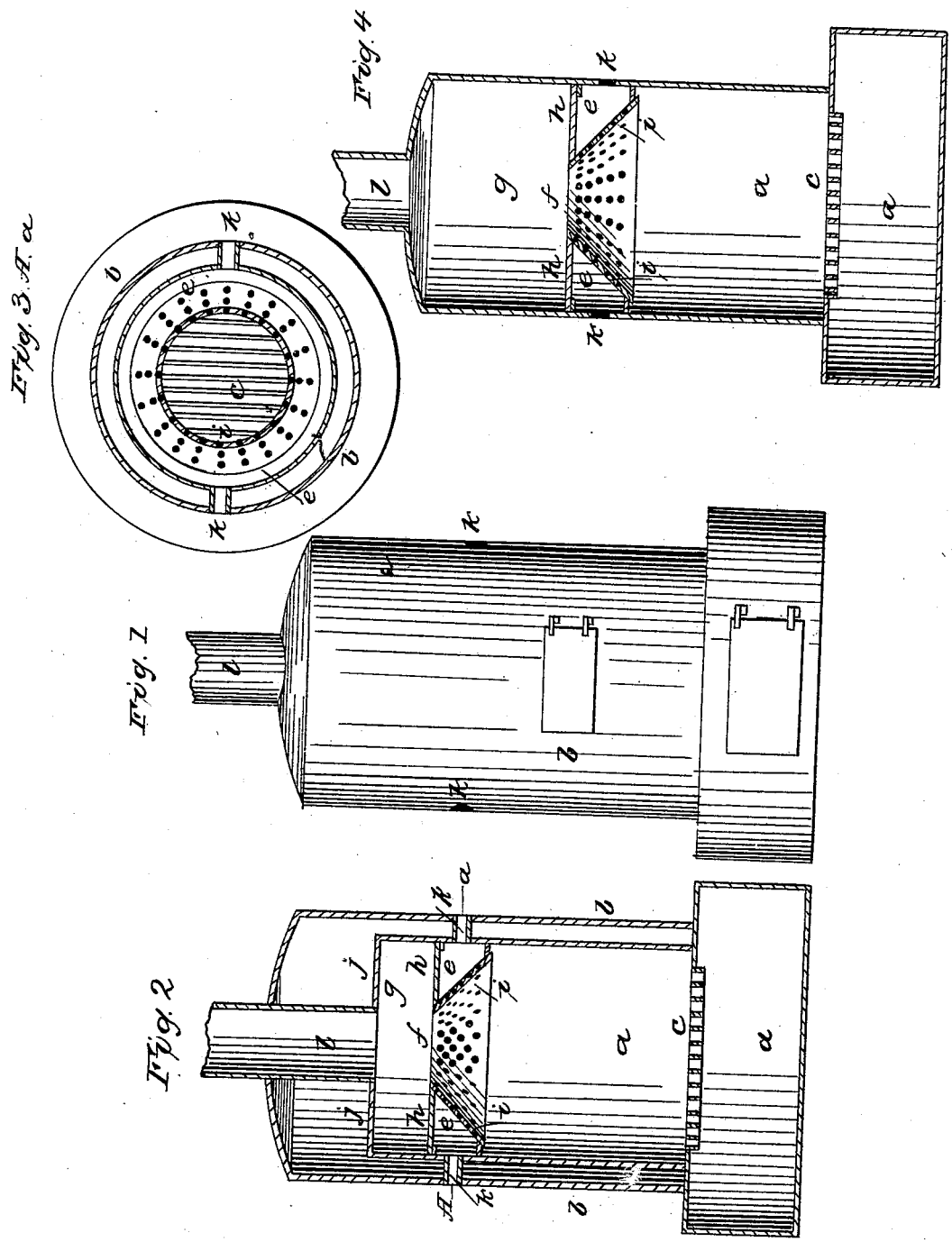

UNITED STATES PATENT OFFICE.

SILAS T. SAVAGE, OF ALBANY, NEW YORK.

FURNACE OF BOILERS AND STOVES.

Specification of Letters Patent No. 20,667, dated June 22, 1858.

*To all whom it may concern:*

Be it known that I, S. T. SAVAGE, of Albany, in the State of New York, have invented a new and useful Improvement in the Furnaces of Boilers and Stoves; and I do hereby declare that the following is a full, clear, and exact description, reference being had to the accompanying drawings, making part of this specification, in which—

Figure 1, is an elevation; Fig. 2, a vertical section; Fig. 3 a horizontal section taken at the line A, *a*, of Fig. 2; and Fig. 4 a vertical section of a modification.

The same letters indicate like parts in all the figures.

The object of my said invention is to consume the combustible gases evolved from the fuel, and at the same time increase the quantity of flame, to render the heat evolved by the combustion more efficient in heating the metal in contact with the water or air to be heated, and to these ends my said invention consists in combining with the fire chamber an air chamber surrounding the escape flue for the products of combustion, which said air chamber has a conical or equivalent formed bottom pierced with numerous holes, placed in the upper part of the fire chamber, the said air chamber being made to communicate with the atmosphere for the free reception of atmospheric air which enters and escapes downward in small jets through the numerous perforations in the conical bottom to the gaseous products of combustion within the fire chamber to inflame the combustible gases evolved from the fire.

In Figs. 1, 2, and 3, of the accompanying drawings which represent my said invention applied to a boiler *a* is the fire chamber which is cylindrical and surrounded by the lower part of the boiler *b*. There is a grate *c* at bottom, with an ash pan *d* below. At the top of the fire chamber there is an air chamber *e*, also surrounded by the cylindrical part of the boiler *b*. This air chamber has a central aperture *f* leading to a chamber of inflammation *g*, which latter is provided with a central exit pipe that passes through the upper part of the boiler to communicate with the chimney. The top, *h*, of this air chamber is a flat ring, and the bottom, *i*, a frustum of a cone pierced with numerous small holes, the concave surface of the said perforated bottom being toward the fire below. The inner circumference of this conical ring is connected with the inner circumference of the ring *h*, as represented. The space between the ring *h*, or top of the air chamber, and a plate *j*, or bottom of the upper part of the boiler, constitutes the chamber in which the inflamed gases burn with an intense flame. There are two or more tubes *k*, *k*, passing through the cylindrical part of the boiler for supplying atmospheric air to the air chamber.

When fire is made in the fire chamber—say with coal—the conical perforated plate, or bottom of the air chamber, is heated, as also the air within this chamber, and as the air is thus heated it escapes into the fire chamber in numerous small jets and meets the combustible gases evolved from the fuel, and mingling with them in a highly heated state inflames them, and the whole, thus inflamed, passes through the central aperture into the chamber of inflammation *g*, in which the flame, thus produced, circulates on its way to the exit pipe *l* leading to the chimney. The quantity of air which will enter the air chamber and thence the fire chamber through the perforations in the conical bottom of the air chamber will depend upon the degree of heat applied to the air chamber, so that the supply of air will depend upon the quantity of combustible gases evolved, for the greater the quantity of gases evolved the greater will be the amount of flame produced. In this way the supply of air is self-regulating, and as the air is discharged in small jets into the fire chamber, and in a downward direction, as the combustible gases are passed upward to the central aperture, on the way to the exit pipe, the mingling of the combustible gases with the support of combustion not only takes place at a high degree of heat, but under circumstances which insure the inflammation of all the combustible matter. The flame thus produced passes through the central aperture in the air chamber and spreads in the chamber of inflammation before escaping through the exit pipe.

Instead of applying my said invention to heating water or generating steam, it will be obvious that it may be applied to a stove or furnace for heating buildings, as represented in Fig. 4, where the parts are indicated by the same letters as in Figs. 1, 2, and 3.

It will be obvious from the foregoing that instead of making the perforated bottom of the air chamber in the form of a cone it may be made spherical, or slightly modified there-from, provided the concave surface be presented downward, and the inner periphery be placed higher than the outer periphery to give the gases a tendency toward the central aperture leading to the chamber of inflammation.

I do not wish to be understood as making claim to the use of a perforated air chamber to supply atmospheric air in small jets to inflame the gaseous products of combustion, as I am aware that this has long been known and tried in various forms, but not, as I verily believe, substantially in the manner or with the results above specified.

What I claim as my invention and desire to secure by Letters Patent is—

The arrangement of the air chamber, substantially as described, with the perforated bottom of a conical, or equivalent shape, placed in the upper part of the fire chamber, with the concave surface downward toward the fire, and with a central aperture leading to the chamber of inflammation, substantially as and for the purpose specified.

SILAS T. SAVAGE.

Witnesses:
WM. H. BISHOP,
JOEL B. WILSON.